United States Patent [19]

Glover et al.

[11] Patent Number: 5,269,390
[45] Date of Patent: Dec. 14, 1993

[54] TRACTION CONTROL SYSTEM

[75] Inventors: Douglas W. Glover, Redditch; Barry J. Bridgens, Quarry Bank; Michael J. Howes, Solihull, all of England

[73] Assignee: Lucas Industries Public Limited Company, West Midlands, England

[21] Appl. No.: 858,024

[22] Filed: Mar. 26, 1992

[30] Foreign Application Priority Data

Apr. 6, 1991 [GB] United Kingdom ............... 9107256

[51] Int. Cl.⁵ .............................................. B60K 31/00
[52] U.S. Cl. ................................. 180/197; 364/426.02
[58] Field of Search ..................... 180/197; 364/426.02

[56] References Cited

U.S. PATENT DOCUMENTS

| | | |
|---|---|---|
| 4,763,912 | 8/1988 | Matsuda ............................... 180/197 |
| 4,790,404 | 12/1988 | Naito .................................... 180/197 |
| 4,946,015 | 8/1990 | Browalski et al. ................... 180/197 |
| 4,955,449 | 9/1990 | Hilburger et al. ................... 180/197 |
| 4,984,649 | 1/1991 | Leiber et al. ........................ 180/197 |

*Primary Examiner*—Margaret A. Focarino
*Assistant Examiner*—Victor E. Johnson
*Attorney, Agent, or Firm*—Nixon & Vanderhye

[57] ABSTRACT

A traction control system is provided for a vehicle having driven wheels driven via a limited slip differential. The amount of wheel spin of each driven wheel is compared with a threshold to detect excessive wheel spin. If excessive spin is detected for both driven wheels, an engine management system reduces the demand output of a vehicle engine. If excessive wheel spin is detected for only one of the driven wheels an engine output greater than the reduced demanded output is demanded so as to allow the limited slip differential to transfer torque to the other driven wheel.

14 Claims, 3 Drawing Sheets

TRACTION CONTROL SYSTEM

BACKGROUND OF THE INVENTION

1. Field of the Invention

The present invention relates to a traction control system. Such a system may be used in a vehicle having first and second driven wheels interconnected by a limited slip differential, for instance of the viscous coupled type.

2. Discussion of the Prior Art

Traction control systems are provided in vehicles, for instance driven by internal combustion engines, in order to control wheel spin. Such systems detect the presence of excessive wheel spin and reduce engine output demand, for instance by acting on an engine management system, until wheel spin falls to or below a target value. Thus, lateral instability of the vehicle caused by wheel spin can be greatly reduced or eliminated.

In a vehicle of the type in which engine power is transmitted to one or more axles with the wheels on each axle being driven by a limited slip differential, difficulties can occur when the wheels of the or one of the axles are on surfaces of substantially different frictional properties ("split $\mu$ surfaces"). If one wheel is on a surface of high friction and the other wheel is on a surface of low friction, the other wheel is more likely to spin. This difficulty is particularly likely to occur when trying to accelerate the vehicle on a hill. Limited slip differentials, for instance of the viscous coupled type, permit the wheels of the axle to rotate at different rates provided the difference between the rates of rotation is not excessive. If the difference becomes excessive, then the differential locks up and transmits a greater portion of engine torque to the non-spinning wheel i.e. the wheel on the higher friction surface. However, the action of the traction control system is such that, when excessive wheel spin is detected, the engine output is reduced, for instance by reducing the engine output demand signal of the engine management system. The reduction in engine output is such as to eliminate wheel spin or reduce it below a threshold level, which may be less than a very few kilometers per hour. This action thus prevents locking of the limited slip differential and transfer of torque to the wheel on the higher friction surface, so that performance of the vehicle suffers.

SUMMARY OF THE INVENTION

According to the invention there is provided a traction control system for a vehicle having first and second driven wheels interconnected by a limited slip differential, comprising means for detecting wheel spin of each of the first and second driven wheels, first means for producing a first signal representing a reduced engine output demand when the detecting means detects that both the first and second driven wheels are spinning, and second means for producing a second signal representing an engine output demand higher than the reduced engine output demand when the detecting means detects that only one of the first and second driven wheels is spinning.

The second signal may represent an engine output demand which is between an operator demanded value and the reduced engine output demand, or may merely represent the demanded value.

The detection means may be arranged to detect when the speed of each of the first and second driven wheels exceeds a reference speed by a predetermined amount. The reference speed may represent vehicle speed and may be determined in various ways, for instance from a speed over ground sensor, from the speed of an undriven wheel, or from the average speed of several undriven wheels. The predetermined amount may be a function of vehicle speed, for instance increasing with the vehicle speed.

The second means may be arranged to be disabled when the vehicle speed exceeds a predetermined speed.

Limiting means may be provided for limiting the second signal when the wheel spin of the one driven wheel exceeds a predetermined threshold. The predetermined threshold may be a function of vehicle speed and, for instance, may decrease as vehicle speed increases in a relatively low vehicle speed range.

It is thus possible to provide a system which allows a limited slip differential to operate correctly so as to improve vehicle performance and lateral stability. When both or all driven wheels are spinning, normal traction control may be performed without intervention. However, when only one wheel is spinning, the traction control system permits at least some wheel spin to continue so as to allow the limited slip differential to transfer torque to the other driven wheel. Should the other driven wheel begin to spin as well, then engine output may be reduced so as to eliminate or reduce wheel spin in order to improve traction and lateral stability. Operation of the limited slip differential is thus not suppressed by a traction control system of this type.

In a vehicle equipped with an engine management system and/or an anti-lock brake system, many or all of the elements of such a traction control system may already be present. For instance, wheel speed transducers and spin calculators are generally already present in an anti-lock brake system and an engine management system generally controls engine output demand on the basis of signals received from accelerator pedals, cruise controls, and the like. Although the traction control system may be embodied as analogue or discrete digital electronic circuits, it may be embodied as a programmed microprocessor, microcomputer, or microcontroller, and the additional programming may be incorporated in the anti-lock brake system and/or in the engine management system where these are embodied as programmed data-processors.

BRIEF DESCRIPTION OF THE DRAWINGS

The invention will be further described, by way of example, with reference to the accompanying drawings, in which.

DETAILED DESCRIPTION OF PREFERRED EMBODIMENTS

Figure 1:
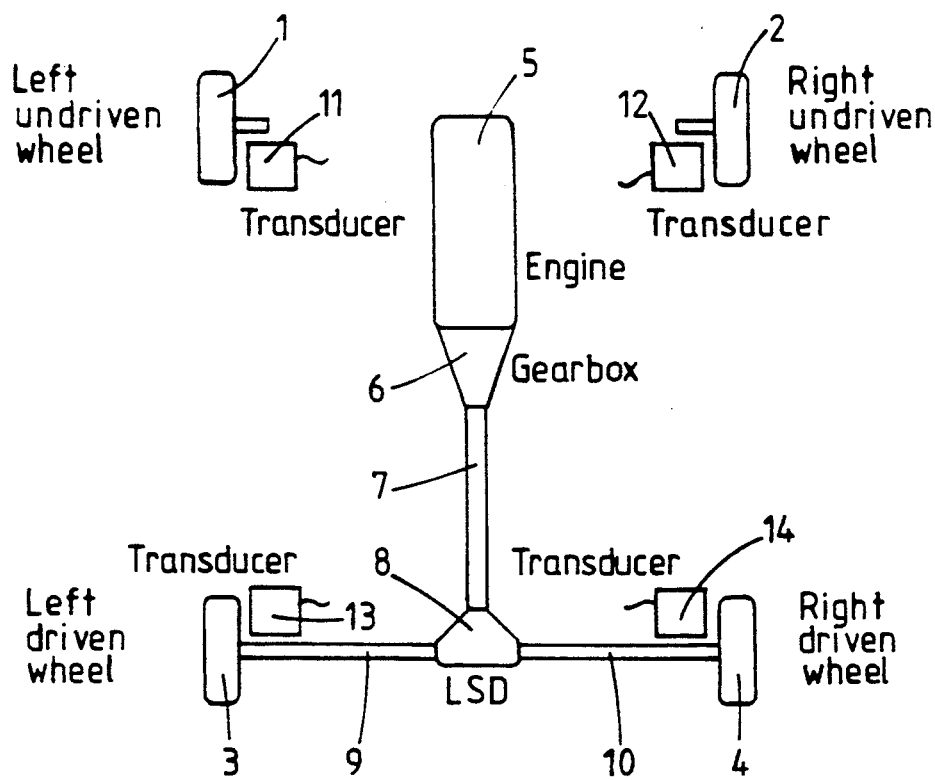
FIG. 1 is a diagram of a vehicle in which a traction control system may be installed.

The vehicle illustrated in FIG. 1 has undriven left and right front wheels 1 and 2 and driven left and right rear wheels 3 and 4. An internal combustion engine 5 supplies torque through a gearbox 6 and a propeller shaft 7 to a limited slip differential 8. The limited slip differential 8 is connected to the rear wheels 3 and 4 by means of half shafts 9 and 10, respectively.

The wheels 1 to 4 are provided with wheel speed transducers 11 to 14, respectively. The transducers may, for instance, be of the variable reluctance type in which a fixed variable reluctance transducer cooperates with a toothed wheel rotating at the same speed as the road wheel so that the frequency of output signals of the sensor is proportional to the road wheel speed. The transducers 11 to 14 may form part of a vehicle antilock brake system.

Figure 2:
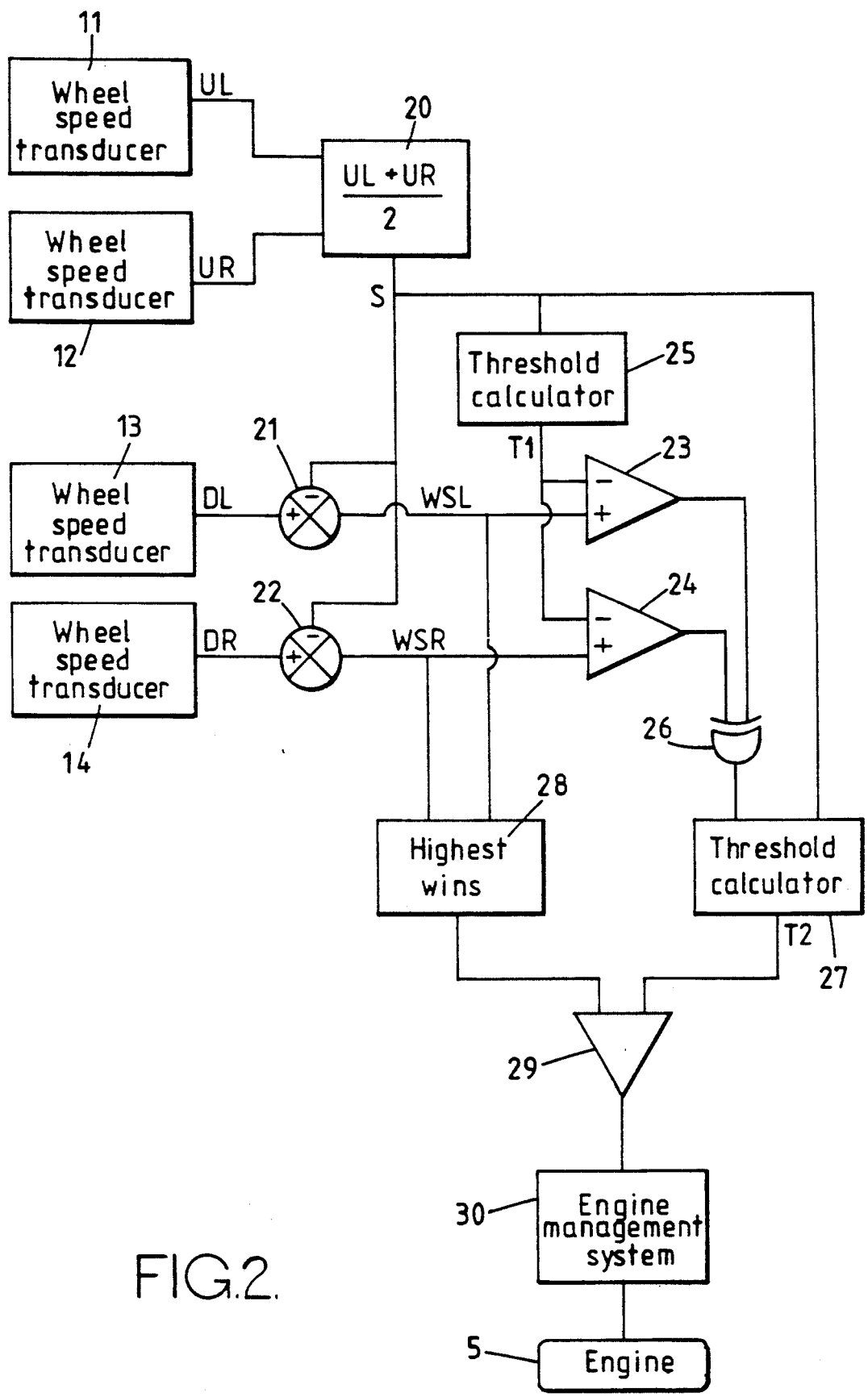
FIG. 2 is a block circuit diagram of a traction control system constituting an embodiment of the invention.

As shown in FIG. 2, the wheel speed transducers 11 and 12 for the undriven wheels 1 and 2 supply signals UL and UR which represent the speeds of the respective wheels to a circuit 20 for forming the average S of the undriven wheel speeds. The signal S thus represents the vehicle speed.

The transducers 13 and 14 supply signals DL and DR representing the speeds of the driven wheels to adding inputs of subtractors 21 and 22, respectively. The subtracting inputs of the subtractors 21 and 22 are connected to the output of the circuit 20. The subtractors 21 and 22 thus provide signals WSL and WSR representing the amounts of wheel spin of the left and right driven wheels 3 and 4, respectively. Thus, the elements recited above, relating to the generation of signals indicative of wheel spin of each of the driven wheels, comprise a detecting means.

The wheel spin signals are supplied to non-inverting inputs of comparators 23 and 24, respectively. Inverting inputs of the comparators 23 and 24 are connected to the output of a threshold calculator 25, whose input is connected to the output of the circuit 20. The threshold calculator 25 supplies a threshold signal T1 which is a function of vehicle speed, as will be described hereinafter.

The outputs of the comparators 23 and 24 are connected to the inputs of an exclusive OR gate 26. The output of the gate 26 and the output of the circuit 20 are connected to a threshold calculator 27 which supplies a second threshold signal T2 as a function of vehicle speed and the output state of the gate 26, which function will be described hereinafter.

The wheel slip signals are supplied to a "highest wins" circuit 28. The circuit 28 supplies at its output the one of the wheel spin signals of higher value.

The outputs of the calculator 27 and the circuit 28 are supplied to a comparator 29 which compares the larger of the wheel spin signals with the second threshold signal T2. If the larger wheel spin exceeds the threshold represented by the signal T2, the comparator 29 supplies a signal to an engine management system 30 causing the system 30 to reduce the output demand applied to the engine 5.

Figure 3:
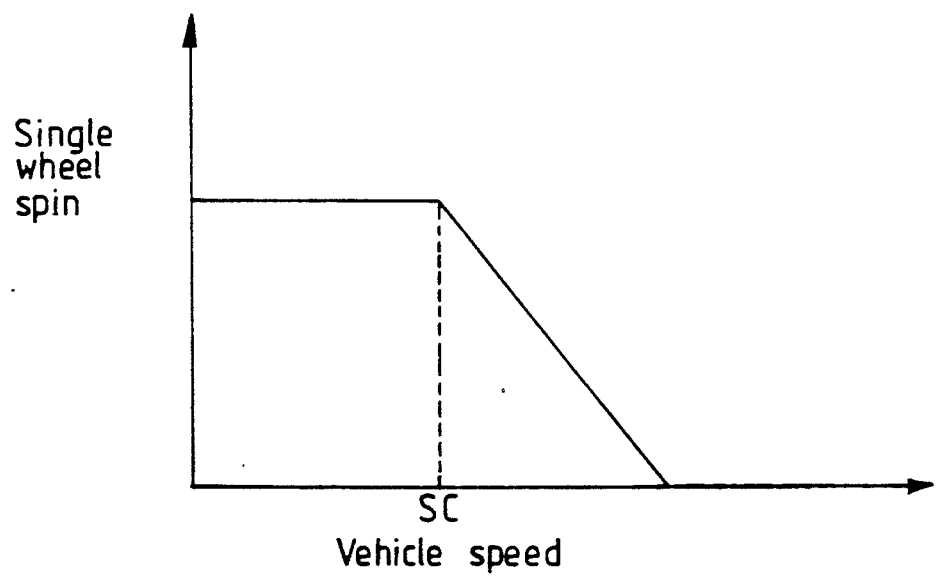
FIG. 3 is a graph of wheel spin against vehicle speed illustrating target spin values.

FIG. 3 illustrates target spin as a function of wheel spin against vehicle speed, which function may be performed by the threshold calculator 27. When only one of the driven wheels 3 and 4 is spinning, only one of the comparators 23 and 24 produces a high level output. The exclusive OR gate 26 thus produces an output signal which causes the threshold calculator 27 to select the target spin function shown in FIG. 3. Thus, the output signal of the gate 26 controls entry into traction control. However, exit from or completion of traction control is controlled by other means (not shown), for instance when zero wheel spin is detected for a predetermined time. The wheel spin of the spinning driven wheel is compared with the target value for the prevailing vehicle speed and the engine management system 30 does not reduce engine output demand unless and until wheel spin exceeds the target value. Thus, if the driven wheels 3 and 4 are on a split μ surface, the half shafts 9 and 10 are allowed to rotate at substantially different speeds so that the limited slip differential 8 transfers torque to the non-spinning wheel. Engine output is only reduced if wheel spin exceeds the target spin value for the prevailing speed, as illustrated in FIG. 3. Thus, the elements recited above, relating to the processing of wheel spin signals into engine output control signals, comprise a signal producing means.

The function in FIG. 3 has a "cut-off" at a vehicle speed SC, which may be controlled or selected so as to ensure that the traction control system permits single wheel spinning at relatively low speed. At speeds substantially higher than the cut-off speed SC, the wheel spin target value is reduced, for instance to the target value used when both wheels are spinning.

Figure 4:
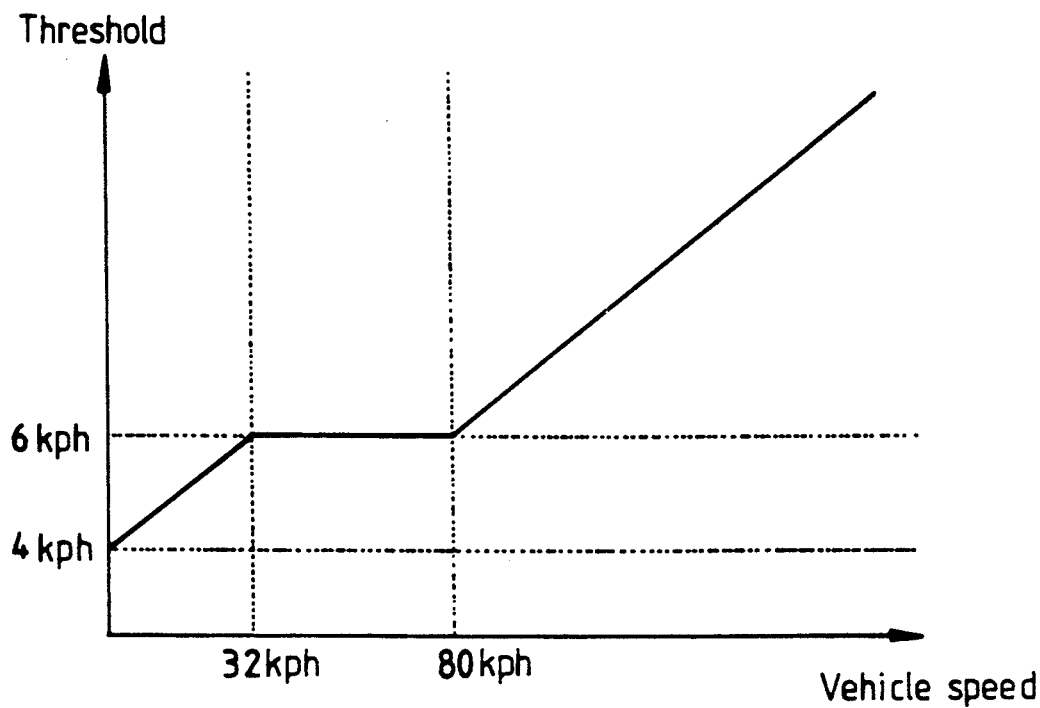
FIG. 4 is a graph of wheel spin threshold against vehicle speed.

FIG. 4 illustrates the operation of the threshold calculator 25 which forms the threshold signal T1 as a function of vehicle speed. In a low speed range below 32 kilometers per hour, the wheel spin detection threshold rises linearly from 4 kilometers per hour for a stationary vehicle to 6 kilometers per hour for a vehicle speed of 32 kilometers per hour. The spin detection threshold stays at this value throughout a middle speed range from 32 to 80 kilometer per hour, above which in a high speed range the spin detection threshold again rises substantially linearly.

Figure 5:
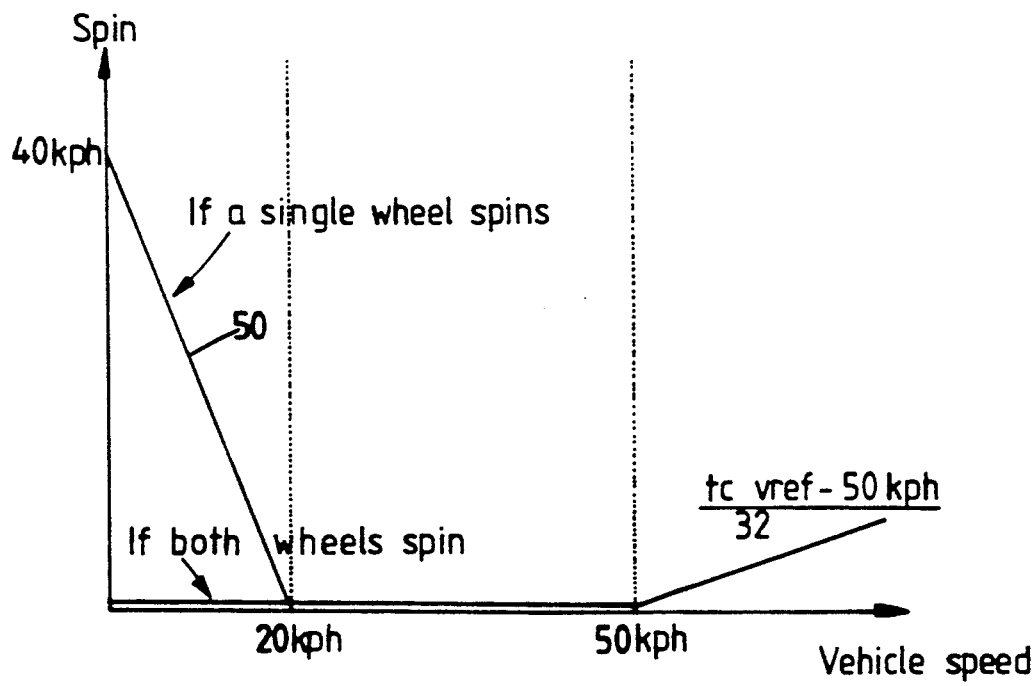
FIG. 5 is a graph of wheel spin against vehicle speed illustrating another target wheel spin function.

FIG. 5 is a graph similar to that of FIG. 3 but illustrating target spin values for spinning a single wheel and spinning of both driven wheels. When the output of the gate 26 indicates that only one of the driven wheels 3 and 4 is spinning, the threshold signal T2 is generated in accordance with the linearly decreasing function segment 50 for speeds below 20 kilometers per hour. The segment 50 decreases linearly from 40 kilometers per hour with the vehicle at rest to a small value, for instance 0.5 kilometers per hour, at a vehicle speed of 20 kilometers per hour. If the output of the gate 26 indicates that both wheels are spinning, the target value of wheel spin is constant through the speed range below 20 kilometers per hour at the value for 20 kilometers per hour.

Above 20 kilometers per hour, the target spin values are the same irrespective of the output of the gate 26. Thus, from 20 kilometers per hour to 50 kilometers per hour, the target spin value remains constant at the value for 20 kilometers per hour. Above 50 kilometers per hour, the target value increases linearly with the vehicle speed in accordance with:

(tc vref-50)/32 where the target spin is given in kilometers per hour, and tc vref is the vehicle speed. Thus, when both of the driven wheels 3 and 4 are spinning i.e. the wheel spin signals exceed the spin threshold illustrated in FIG. 4 corresponding to the vehicle speed, the engine management system reduces engine output power until wheel spin falls to or below the target value illustrated in FIG. 5 for the prevailing vehicle speed. However, if only one driven wheel is spinning and the vehicle speed is less than 20 kilometers per hour, the engine management system 30 only reduces engine output if the wheel spin exceeds the target value corresponding to vehicle speed defined by the line segment 50. The wheel is therefore allowed to spin so that the limited slip differential 8 is allowed to operate and transfer torque to the non-spinning wheel.

The traction control system thus allows the limited slip differential to operate correctly. The acceleration of the vehicle on split-$\mu$ surfaces is thus improved without any detriment to the lateral stability of the vehicle. Problems associated when accelerating a vehicle on a split $\mu$ surface, particularly when a vehicle is ascending an incline, are thus reduced or eliminated.

We claim:

1. A traction control system for a vehicle having first and second driven wheels interconnected by a limited slip differential and driven by an engine having an output responsive to engine output demand signals, said traction control system comprising:
   detecting means for detecting wheel spin of each of the first and second driven wheels, and
   signal producing means, responsive to said detecting means, for producing a first engine output demand signal for reducing said engine output when said detecting means detects that both the first and second driven wheels are spinning, and for producing a second engine output demand signal for reducing said engine output less than said first engine output demand signal when said detecting means detects that only one of the first and second driven wheels is spinning.

2. A traction control system as claimed in claim 1, wherein the second engine output demand signal represents an engine output demand which is between a vehicle operator demanded value and the first engine output demand signal of said signal producing means.

3. A traction control system as claimed in claim 1, wherein the second signal represents a vehicle operator demanded value.

4. A traction control system as claimed in claim 1, wherein said detection means includes means for detecting when the speed of each of the first and second driven wheels exceeds a reference speed by a predetermined amount.

5. A traction control system as claimed in claim 4, wherein the reference speed is a vehicle speed.

6. A traction control system as claimed in claim 4, wherein the predetermined amount is a function of a vehicle speed.

7. A traction control system as claimed in claim 6, wherein the predetermined amount increases with the vehicle speed.

8. A traction control system as claimed in claim 1, wherein said signal producing means includes means for disabling said second signal when said vehicle speed exceeds a predetermined speed.

9. A traction control system as claimed in claim 1, further comprising limiting means for limiting the engine output demanded by said second signal when the wheel spin of the one spinning wheel exceeds a predetermined threshold.

10. A traction control system as claimed in claim 9, wherein the predetermined threshold is a function of a vehicle speed.

11. A traction control system as claimed in claim 10, wherein the predetermined threshold decreases as the vehicle speed increases.

12. A traction control system as claimed in claim 10, wherein the predetermined threshold decreases as the vehicle speed increases in a vehicle speed range of 0 to 20 kilometers per hour.

13. A traction control system as claimed in claim 1, in which said signal producing means is further arranged to produce the first signal when a vehicle speed exceeds a predetermined speed and said detecting means detects that only one of the first and second driven wheel is spinning.

14. A traction control system as claimed in claim 1, in which said signal producing means includes means for substituting said first signal for said second signal when the wheel spin of the one spinning wheel exceeds a predetermined threshold.

* * * * *